(12) United States Patent
Edwards et al.

(10) Patent No.: US 9,722,796 B2
(45) Date of Patent: Aug. 1, 2017

(54) INCREASING SECURITY IN INTER-CHIP COMMUNICATION

(71) Applicant: National Technology & Engineering Solutions of Sandia, LLC, Albuquerque, NM (US)

(72) Inventors: Nathan J. Edwards, Albuquerque, NM (US); Jason Hamlet, Albuquerque, NM (US); Todd Bauer, Albuquerque, NM (US); Ryan Helinski, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 334 days.

(21) Appl. No.: 14/494,306

(22) Filed: Sep. 23, 2014

(65) Prior Publication Data
US 2015/0052364 A1 Feb. 19, 2015

Related U.S. Application Data

(62) Division of application No. 13/782,808, filed on Mar. 1, 2013, now Pat. No. 8,874,926.

(60) Provisional application No. 61/608,486, filed on Mar. 8, 2012.

(51) Int. Cl.
| | |
|---|---|
| *H04L 9/32* | (2006.01) |
| *G06F 21/55* | (2013.01) |
| *G06F 21/85* | (2013.01) |
| *H04L 9/08* | (2006.01) |
| *G09C 1/00* | (2006.01) |
| *H04L 9/00* | (2006.01) |

(Continued)

(52) U.S. Cl.
CPC ............ *H04L 9/3247* (2013.01); *G06F 11/27* (2013.01); *G06F 21/556* (2013.01); *G06F 21/558* (2013.01); *G06F 21/75* (2013.01); *G06F 21/85* (2013.01); *G09C 1/00* (2013.01); *H01L 23/57* (2013.01); *H04L 9/003* (2013.01); *H04L 9/0869* (2013.01); *H04L 9/3278* (2013.01); *H01L 2924/0002* (2013.01); *H04L 2209/12* (2013.01); *H04L 2209/72* (2013.01)

(58) Field of Classification Search
CPC ........ G06F 21/75; G06F 21/85; G06F 21/558; G06F 11/27; G06F 21/556; H01L 23/57; H01L 2924/0002; H01L 2924/00; H04L 9/0869; H04L 9/3247; H04L 9/3278; H04L 9/003; H04L 2209/72; H04L 2209/12; G09C 1/00
See application file for complete search history.

(56) References Cited

U.S. PATENT DOCUMENTS

| | | | |
|---|---|---|---|
| 5,815,493 A | | 9/1998 | Riley |
| 5,949,786 A | * | 9/1999 | Bellenger ............. H04L 45/745 370/401 |

(Continued)

*Primary Examiner* — Michael Pyzocha
(74) *Attorney, Agent, or Firm* — Blakely, Sokoloff, Taylor & Zafman, LLP

(57) ABSTRACT

An apparatus for increasing security in inter-chip communication includes a sending control module, a communication bus, and a receiving control module. The communication bus is coupled between the sending control module and the receiving control module. The sending control module operates to send data on the communication bus, disable the communication bus when threats are detected, or both.

14 Claims, 6 Drawing Sheets

(51) Int. Cl.
*G06F 11/27* (2006.01)
*H01L 23/00* (2006.01)
*G06F 21/75* (2013.01)

(56) References Cited

U.S. PATENT DOCUMENTS

| | | | |
|---|---|---|---|
| 6,111,950 A * | 8/2000 | Fredlund | G06T 1/00 |
| | | | 213/179 |
| 6,115,818 A * | 9/2000 | Barton | G06T 1/0028 |
| | | | 348/E7.056 |
| 6,487,250 B1 | 11/2002 | Kato et al. | |
| 6,636,971 B1 * | 10/2003 | Loukianov | G06F 21/79 |
| | | | 713/176 |
| 6,867,595 B2 * | 3/2005 | Chen | G01R 31/3665 |
| | | | 320/132 |
| 7,076,711 B1 | 7/2006 | Amin et al. | |
| 7,106,091 B2 | 9/2006 | Gammel | |
| 7,395,483 B1 * | 7/2008 | Tourancheau | H03M 13/09 |
| | | | 714/757 |
| 7,555,787 B2 | 6/2009 | Clercq | |
| 8,930,320 B2 * | 1/2015 | Tung | G06F 11/1451 |
| | | | 707/652 |
| 8,954,734 B2 * | 2/2015 | Nam | G06F 21/10 |
| | | | 713/160 |
| 2002/0112109 A1 | 8/2002 | Jorgenson | |
| 2003/0070075 A1 * | 4/2003 | Deguillaume | G06T 1/0042 |
| | | | 713/176 |
| 2005/0166053 A1 * | 7/2005 | Cui | H04L 9/3239 |
| | | | 713/176 |
| 2005/0204163 A1 * | 9/2005 | Alkove | G06F 21/10 |
| | | | 726/5 |
| 2007/0127918 A1 * | 6/2007 | Ames | H01S 5/06825 |
| | | | 398/17 |
| 2007/0255777 A1 * | 11/2007 | Saitoh | G06F 7/588 |
| | | | 708/251 |
| 2010/0217985 A1 * | 8/2010 | Fahrny | G06F 21/10 |
| | | | 713/169 |
| 2011/0022916 A1 * | 1/2011 | Desai | G06F 1/3203 |
| | | | 714/748 |
| 2011/0073640 A1 * | 3/2011 | Faith | G06K 19/086 |
| | | | 235/375 |
| 2012/0042396 A1 * | 2/2012 | Guerra | G06F 21/88 |
| | | | 726/30 |
| 2012/0102329 A1 * | 4/2012 | Mittal | G06F 21/10 |
| | | | 713/176 |
| 2012/0284522 A1 * | 11/2012 | Lewis | H04L 63/0435 |
| | | | 713/181 |
| 2013/0019324 A1 * | 1/2013 | Tehranipoor | H03K 3/0315 |
| | | | 726/34 |
| 2013/0176104 A1 * | 7/2013 | Rich | H04W 12/06 |
| | | | 340/5.8 |
| 2013/0318607 A1 * | 11/2013 | Reed | G06F 11/3062 |
| | | | 726/23 |

\* cited by examiner

INCREASING SECURITY IN INTER-CHIP COMMUNICATION

CROSS REFERENCE TO RELATED APPLICATIONS

This application is a divisional application of utility application U.S. patent application Ser. No. 13/782,808 entitled "Increasing Security in Inter-Chip Communication" filed Mar. 1, 2013 which claims priority under the provisions of 35 U.S.C. §119(e) to U.S. Provisional Application No. 61/608,486 filed Mar. 8, 2012. Both of the aforementioned applications are incorporated herein by reference.

STATEMENT REGARDING FEDERALLY SPONSORED RESEARCH

This invention was developed with Government support under Contract No. DE-AC04-94AL85000 between Sandia Corporation and the U.S. Department of Energy. The U.S. Government has certain rights in this invention.

TECHNICAL FIELD

This disclosure relates generally to communication security, and in particular but not exclusively, relates to secure communication between electronic components in an embedded system.

BACKGROUND INFORMATION

Confidentiality and authenticity of data is of utmost importance. The mass deployment of easily accessible embedded devices to control critical infrastructure systems, and the use of embedded systems in other sensitive applications, illustrate the need for protecting the data processed by these systems. Many existing systems use one or more integrated circuit devices/chips to collect and distribute data to other devices within the embedded system through circuit board communication buses. These communication buses may be easily accessible on the circuit board and their data easily acquired with an unauthorized oscilloscope or other bus monitoring devices, which are sometimes termed "sniffers" or "probing threats". Many existing low-level cyber security proposals use mechanisms that solely depend on encryption algorithms attempting to balance embedded system performance with security. Unfortunately, the encrypted data is still accessible by unauthorized oscilloscope acquisition and data access patterns might be correlated to system behavior to leak information. Alternately, depending on the encryption mechanism used, the data can be recovered by a brute force method on a highly parallel computer system. Furthermore, the authenticity of a sending device/chip is rarely verified by hardware.

To combat unauthorized oscilloscope access, some systems have implemented more complicated encryption and decryption schemes or use certificates. However, these schemes may add an unacceptable amount of overhead to inter-chip communication latencies and still leave the hardware susceptible to potential attacks that breach confidentiality and still do not address the authenticity issues.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1:
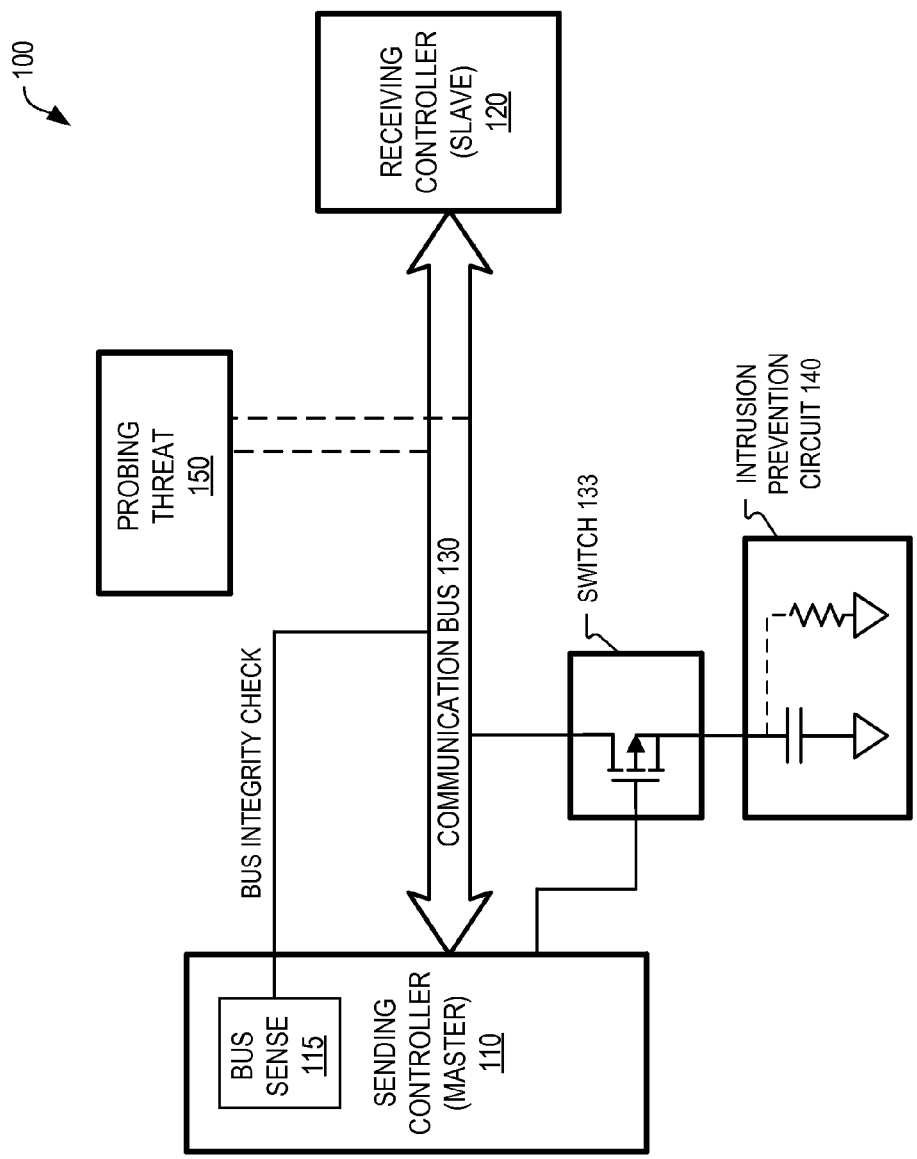
FIG. 1 illustrates an example embedded system including a sending controller that is configured to couple and de-couple an intrusion prevention circuit to a communication bus, in accordance with an embodiment of the disclosure.

Embodiments of a system and method for increasing inter-chip communication are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The embodiments described in this disclosure may help address the fundamental issues of confidentiality and authentication of the communication between two integrated circuit devices within a single embedded system. Some of the disclosed embodiments provide low-level intrusion prevention, detection, and authentication of data communication bus protocols.

Depending on the protocol, communication between two hardware devices occurs by transistors or transceivers switching to logic high or logic low to indicate a binary bit value. The communication bus would then reflect the transistor's output. The receiving device is sensitive enough to detect the logic transitions on the bus and interpret the binary bit value.

Depending on the physical characteristics of the initiating sender device (known as the master), receiving device (known as the slave), and the communication protocol specifications, the data is susceptible to distortion when the communication bus has certain analog characteristics, such as electromagnetic effects, capacitance, and line resistance. For example, if the bus capacitance is sufficiently large and the sending transistor attempts to change the logic value on the bus from high to low, the capacitance will maintain a logic high value since a capacitor is a constant voltage energy storage device. Within a differential-pair type bus, a sufficiently large bus capacitance will cause excessive oscillatory ringing. Therefore, binary communication is distorted or cannot occur. Alternately, if the load resistance of the communication bus is too large, the signal sent from the sending transistor will be dissipated by the resistor. This signal loss may prevent the receiving device from correctly interpreting data communicated over the bus. Other analog characteristics, such as electromagnetic effects and inductance, can also render the communication bus inoperable.

Certain inter-chip communication specifications list detailed physical limitations of the protocol. For example, the I²C protocol developed by Phillips/NXP has a maximum bus capacitance of 400 picofarads before binary communication becomes unreliable and distorted. As another example, the PCI-Express specification has a maximum bus capacitance of 1000 microfarads. Other communication protocols such as Controller Area Network ("CAN") and Universal Serial Bus ("USB"), which use a single pair of differential conductors, and many parallel data communication protocols are also susceptible to changes in bus capacitance, line resistance, and other electrical characteristics.

FIG. 1 illustrates an example embedded system 100 including a sending controller 110 that is configured to couple and de-couple an intrusion prevention circuit 140 to a communication bus 130, in accordance with an embodiment of the disclosure. Sending controller 110 is coupled to communication bus 130 to send data across the bus. In the illustrated embodiment, receiving controller 120 is coupled to receive communication from sending controller 110, but it is understood that more than one receiving controller may be coupled to communication bus 130 to receive data and more than one sending controller 110 may be coupled to send data. If more than sending controller 110 is coupled to send data, additional logic may be required to manage bus communications. Sending controller 110 may be a processor, microcontroller, field-programmable gate array ("FPGA"), or other control logic.

In FIG. 1, sending controller 110 is coupled to control a switch 133. In other words, switch 133 is coupled to be enabled and disabled by sending controller 110. Switch 133 may be a relay or other component that operates to connect electric nodes. In the illustrated embodiment, switch 133 is a P-channel metal-oxide-semiconductor field-effect transistor ("MOSFET"). The P-channel MOSFET may be a power-rated MOSFET that is turned ON when sending controller 110 applies a logic low to a gate of the P-channel MOSFET. Switching designs other than the illustrated P-channel MOSFET are possible. When sending controller 110 turns switch 133 ON (enabled), intrusion prevention circuit 140 becomes coupled to communication bus 130. When sending controller 110 turns switch 133 OFF (disabled), intrusion prevention circuit 140 becomes de-coupled to communication bus 130.

Intrusion prevention circuit 140 is coupled to alter at least a first analog characteristic of communication bus 130, when switch 133 is enabled. In the illustrated embodiment, intrusion prevention circuit 140 includes a capacitor that prevents communication on communication bus 130 by altering the capacitive characteristics of communication bus 130 (when intrusion prevention circuit 140 is coupled to the bus). Optionally, a "bleed off" resistor may be added to intrusion prevention circuit 140 (as illustrated) to help discharge the capacitor to ensure that bus capacitance returns to normal. Although the illustrated embodiment shows intrusion prevention circuit 140 to alter the capacitance of bus 130, other circuits that alter different characteristics (e.g. resistance) of bus 130 may also be used to prevent communication across bus 130. By coupling and de-coupling intrusion prevention circuit 140 to communication bus 130, sending controller 110 may regulate or control when communication bus 130 is operable.

In FIG. 1, sending controller 110 includes a bus sense module 115 coupled to perform a bus integrity check on communication bus 130. The bus sense module 115 may include resistance and/or capacitance sensing technology. In one embodiment, sending controller 110 is a system-on-chip ("SoC") microcontroller that includes analog to digital converters that may be included in bus sense module 115. Bus sensing module 115 may include capacitance sensing capabilities, as is commonly used in association with capacitive touch screen devices. The capacitance sensing capabilities should be configured at the appropriate resolution to differentiate variance in the electrical response (e.g. 1 picofarad resolution for capacitance). Bus sense module 115 may also be located partially or completely outside of sending controller 110.

In performing a bus integrity check, bus sense module 115 may measure an analog characteristic (e.g. capacitance or resistance) of bus 130. Sending controller 110 may then compare that measurement to a previous measurement(s). The previous measurement(s) may include a calibration measurement measured during a protected manufacturing process.

An unauthorized "sniffer" device (e.g. probing threat 150) attached to the system will change the physical characteristics of communication bus 130 or embedded system 100. For example, I²C enabled devices usually add 10 picofarads to 20 picofarads of capacitance to the communication bus. If the bus integrity check measurement or its derivatives (e.g. first-order, second-order, etc.) differs from previous measurements by more than a certain threshold value, sending controller 110 may suspect that probing threat 150 is coupled to communication bus 130.

Communication bus 130's line resistance can be measured using a voltage divider circuit and analog to digital conversion. In addition, dynamic measurements of bus 130 can also be performed while intrusion prevention circuit 140 is changing to a steady state. This might include measuring the capacitance discharge time-constant of communication bus 130. An increase of capacitance on bus 130 from an intrusion (e.g. probing threat 150) will directly affect the time-constant. The measurement hardware may be integrated within a SoC design of the Master device.

Figure 2:
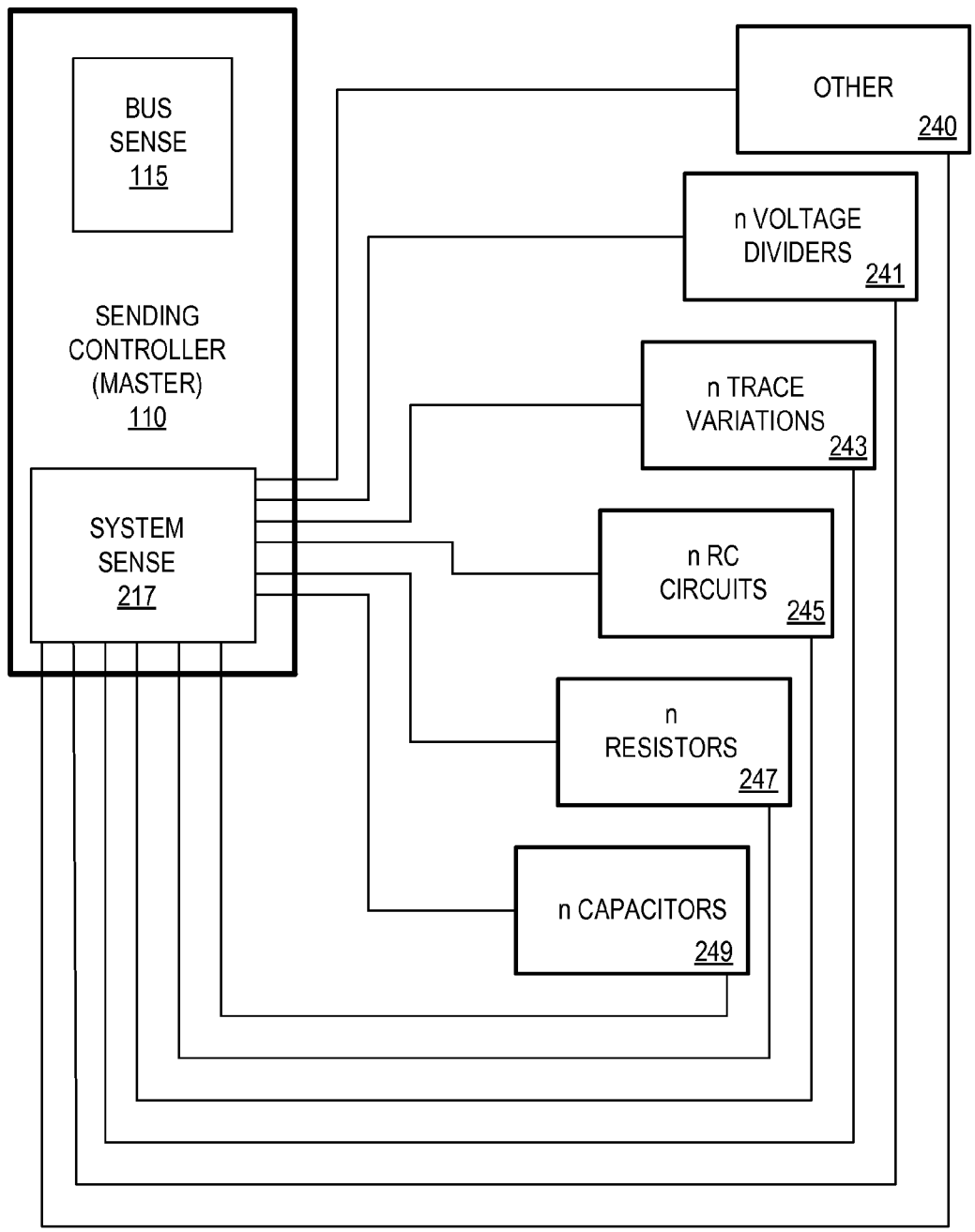
FIG. 2 illustrates a sending controller including a system sense module coupled to perform a system integrity check of the embedded system in which the sending controller is disposed, in accordance with an embodiment of the disclosure.

FIG. 2 illustrates sending controller 110 including a system sense module 217 coupled to perform a system integrity check of the embedded system in which the sending controller is disposed, in accordance with an embodiment of the disclosure. In the illustrated embodiment, system sense module 217 is configured to measure example analog characteristics of at least a portion of the embedded system (e.g. embedded system 100) that sending controller 110 and bus 130 are disposed in. The system integrity checks performed by system sense module 217 may be performed on a predefined region of the embedded system and then compared with previous measurements of that predefined region.

A system integrity check may be performed using Physical Unclonable Function ("PUF") methodologies where the Master device (e.g. sending controller 110) sends a challenge signal to multiple analog components, various circuit board trace patterns, and sub-circuits (voltage dividers, RC oscillators, etc.) installed on the circuit board. System sense module 217 can then measure the response signal from the analog components and compare that to previous response signals generated by previous challenge signals. The response measurements and/or algorithmically combined measurements are then checked to ensure that they are within tolerances. If the response measurements are outside of predetermined tolerances, this may indicate an unauthorized intruder (e.g. probing threat 150) is on the system.

Some example analog components are shown in FIG. 2. For example, some board-level PUFs may include one or a combination of n voltage dividers 241, n trace variations 243, n Resistive-Capacitive ("RC") circuits 245, n resistors 247, n capacitors 249, or other board-level PUFs 240 (e.g. circuit board trace patterns). Those skilled in the art appreciate that slight manufacturing differences can give seemingly identical components non-identical values. These manufacturing variances can then be measured to generate unique identifiers that are not easily ascertained or duplicated by adversaries. It is also appreciated that silicon based PUFs can be used as a way to generate a system signature that can be measured in system integrity checks. When an intruder physically accesses an embedded system, it is likely to alter the measurement associated with a PUF that is being measured as part of a system integrity check. Therefore, an unexpected difference in a system integrity check measurement may indicate an intruder, and sending controller 110 may stop sending data across communication bus 130 in response to an indication of an intruder.

Integrity check measurements and device signature tolerances may be determined by statistical methods during a secure process in manufacturing that occurs shortly before final assembly of the embedded device. In one embodiment, a Printed Circuit Board ("PCB") is populated with all components and all PCBs of the system must be assembled so that all factors affecting the predefined measured region are in a functional state prior to acquiring initial calibration measurements. Each device manufactured is expected to have different system signatures and measurements due to the varying characteristics of the components and PCB(s) used. The tolerance levels may be programmed into the embedded device read-only memory (ROM) also during the secure manufacturing process.

It is understood that the scope for the system integrity check must be established for each system. In other words, it must be determined during system integration if the integrity check should include a small region on the circuit board that encompasses all potential communication pathways between both the Master and Slave devices, or the whole circuit board, or the whole embedded system. Existing methodologies for robust parameter design and system verification testing may be used to ensure the appropriate test cases are covered.

Figure 3:
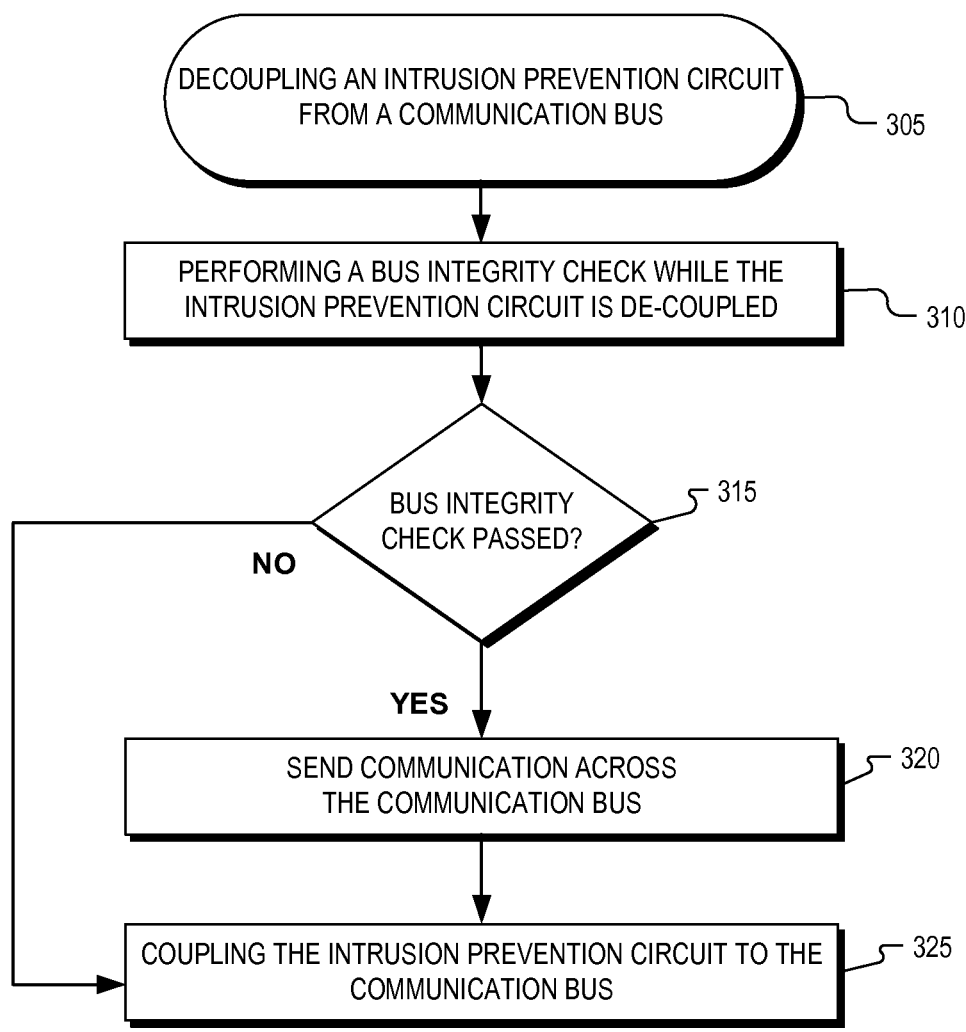
FIG. 3 is a flow chart illustrating an example process of increasing security on a communication bus, in accordance with an embodiment of the disclosure.

FIG. 3 is a flow chart illustrating an example process 300 of increasing security on a communication bus, in accordance with an embodiment of the disclosure. The order in which some or all of the process blocks appear in process 300 should not be deemed limiting. Rather, one of ordinary skill in the art having the benefit of the present disclosure will understand that some of the process blocks may be executed in a variety of orders not illustrated, or even in parallel.

In process block 305, an intrusion prevention circuit (e.g. intrusion prevention circuit 140) is decoupled from a communication bus (e.g. communication bus 130). Sending controller 110 may de-couple intrusion prevention circuit 140 from communication bus by disabling a switch (e.g. switch 133). While the intrusion prevention circuit is decoupled, a bus integrity check is performed (process block 310). The bus integrity check includes measuring at least one analog characteristic of the communication bus. The intrusion prevention circuit need only be disabled (decoupled) for a short time to perform the bus integrity check. The actual time limitation may be determined by the communication protocol and baud rate. A reasonable time limitation is two communication acknowledgement periods (i.e. the time it takes for normal protocol communication to send two data packets, where each requires an ACK). For example, in the I$^2$C serial protocol, a device first sends the slave address and waits for an ACK; then it sends eight (8) data bits and waits for an ACK. When the intrusion prevention circuit includes a capacitor to alter the capacitance of bus 130, the optional "bleed off" resistor depicted in FIG. 1, may help discharge the capacitor to ensure that bus capacitance returns to normal and the bus integrity check can be performed within a given time limitation.

If the bus integrity check is passed (decision block 315) it is likely safe to send communication across bus 130 and process 300 continues to process block 320. In process block 320, a communication is sent across the communication bus. In one embodiment, when authorized communication is desired, a Master device (e.g. sending controller 110) decouples the intrusion prevention circuit from the bus and then sends a communication across the bus after the transient noise (from decoupling the intrusion prevention circuit) dissipates. In process block 325 (after the communication has been sent across the bus), the intrusion prevention circuit is coupled to the bus. Since the intrusion prevention circuit is now coupled to the bus, a second analog characteristic of the bus is altered, which disables communication across the bus. The first analog characteristic (measured by the bus integrity check) and the second analog characteristics (altered by the intrusion prevention circuit 140) may be the same or different.

In process block 315, if the bus integrity check is failed (i.e. an intruder is likely present), process 300 may proceed to process block 325, where the intrusion prevention circuit is coupled to the bus, making the bus inoperable for communication. Making the bus inoperable for communication may protect the bus from having an intruder "learn" the bus data or encryption protocols.

Process 300 may also include a system integrity check as described above. The system integrity check may be performed on a portion of the embedded system that holds the intrusion prevention circuit and the communication bus. If system integrity check is failed, process 300 may proceed to process block 325. In one embodiment, different integrity checks are performed on different regions or analog characteristics of the embedded system. The different integrity checks may be performed at different points in process 300. The different integrity checks may be randomized in order to increase security by making the integrity checks unpredictable.

It is understood that a cyber-adversary could permanently render inter-chip communication disabled by removing/blocking switch 133 or by sending a large power surge on the communication bus damaging the communication transistors. This may be an acceptable risk in protecting data confidentiality.

Figure 4:
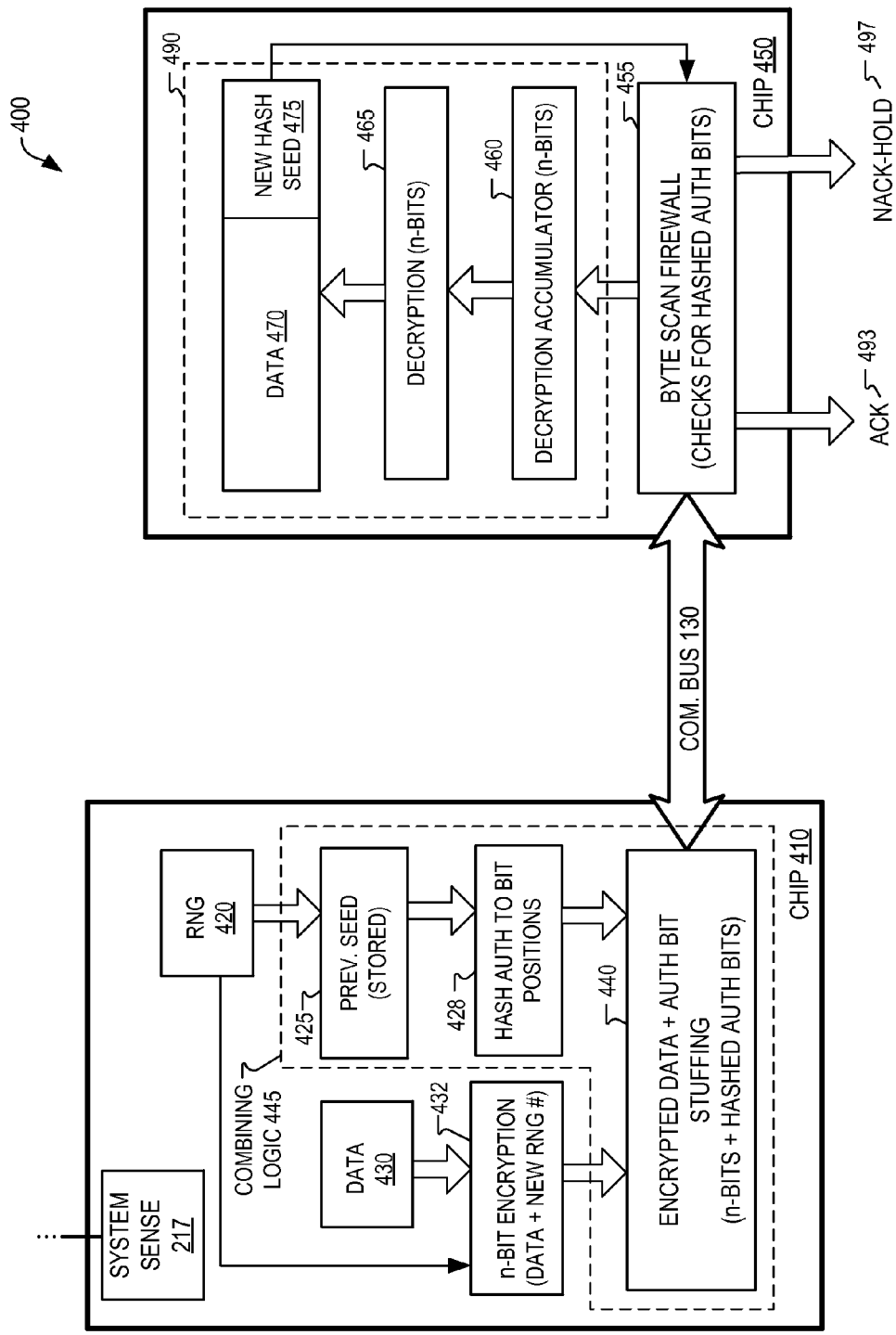
FIG. 4 illustrates an example embedded system including a communication bus connecting a sending chip that includes encryption logic and a receiving chip that includes firewall and decryption logic, in accordance with an embodiment of the disclosure.

FIG. 4 illustrates an example embedded system 400 including a communication bus 130 connecting a sending chip 410 and a receiving chip 450, in accordance with an embodiment of the disclosure. In the illustrated embodiment, sending chip 410 includes a system sense module 217, a random number generator ("RNG") 420, combining logic 445, data 430, and encryption logic 432. Receiving chip 450 includes decryption logic 490 and firewall logic 455.

RNG 420 may generate random numbers from electrical oscillations of RC circuit(s) by digitizing the various voltage levels along with a digital logic algorithm to create an n-bit random number or from other algorithms and schemes known in the art. Existing circuitry that provides electrically oscillating characteristics may be used for this function.

RNG 420 is coupled to combining logic 445, in FIG. 4. Combining logic 445 is coupled to generate a hashed authentication signature based on a fresh random number from RNG 420 and an authentication signature of sending chip 410. The authentication signature of sending chip 410 may be found on-board the sending chip 410. For example, the authentication signature of sending chip 410 may be a serial number or manufacturing number of sending chip 410. In one embodiment, the authentication signature of sending chip 410 is generated by system sense module 217.

System sense module 217 may be coupled to generate an authentication signature of the sending chip 410 by performing a system integrity check, as already described in this disclosure. The system integrity check may include sending challenges signals to measure analog characteristics of a Physically Unclonable Function ("PUF") region of embedded system that includes the sending control module. This authentication signature may be sent in an initial (i.e. at startup after a power up or reset) communication frame to receiving chip 450, in order to verify authentication of the sending chip 410. The authentication signature may also be sent after specified intervals, to verify authenticity. The passing of large authentication signatures does not need to occur with every communication frame due to the possible unacceptable decrease in throughput on a low-powered embedded system, but it may be necessary for specific operations that require more security.

Combining logic 445 is coupled to generate a hashed authentication signature based on a fresh random number from RNG 420 and the authentication signature of sending chip 410. Combining logic 445 is further coupled to generate a communication frame by the combining the hashed authentication signature and encrypted data.

Encryption logic 432 is coupled to generate the encrypted data by encrypting data 430. Data 430 may be stored in a memory of sending chip 410. Encryption logic 432 may be coupled to RNG 420 to receive the fresh random number. In that case, encryption logic 432 is coupled to generate combined data from combining the fresh random number with data 430, and then encrypt the combined data into the encrypted data that will be combined by combining logic 445. Then, the fresh random number is sent with each encrypted communication frame so that the slave device (e.g. chip 450) can generate the new hash seed 475 in the next communication frame firewall scan, discussed below. Encryption logic 432 may use existing technology such as Advanced Encryption Standard ("AES") or other proven encryption variants. Specific SoC encryption hardware accelerators maybe beneficial to include. Encryption could be optional in a system that ensures the complete integrity of its communication bus (e.g. the bus and data cannot be accessed physically, electromagnetically or optically). Yet, due care must be taken to exhaustively ensure that all integrity cases are checked, although in practice this may be costly. For this reason, encryption may be preferred.

In one embodiment, combining logic 445 receives a fresh random number from RNG 420 and generates a hash seed to be used in a hash function in block 428. The hash seed depends on the past history of seeds, rather than only the RNG. In block 425, combining logic 445 is coupled to generate a hash seed from combining the fresh random number from RNG 420 with a previous hash seed. For example, the freshly generated random number might be XORed with the previous hash seed (which may also depend on previous random numbers). This time-dependent evolution of the hash seed implies that, even if two systems were initially identical at some time, they will evolve differently, and so they might be identical only for a very brief instance. It also means that an adversary needs to access more than RNG 420 to work an attack on this aspect of the system.

A new random number is generated on a predefined interval such that a new one exists with each data communication frame at a minimum. In one embodiment, the old random numbers are not stored in memory with the exception of the immediate previous hash seed that is used for the current data communication frame. This immediate previous hash seed is stored in non-volatile memory such that in the event of a low-power or brown-out event, communication can be established securely with the previous hash-seed value while providing a new randomly generated number and seed for the next communication frame. Careful microprocessor memory practices, such as zeroizing previous memory locations before updating pointers, should be followed.

In block 428, combining logic 445 uses the hash seed to generate a hashed authentication signature. Block 428 generates the hashed authentication signature by hashing the authentication signature of sending chip 410 with the hash seed. As discussed above, the authentication signature of sending chip 410 may be an electronically accessible serial number of the sending chip, or it may be signatures generated by system sense module 217.

In one embodiment, the hash function in block 428 is used to hash a chip 410's bus address, authentication signature, or subset of the authentication signature such that the bits of the authentication data are inserted into the communication frame in random order (randomness is derived from the seed numbers). The hashed authentication signature may be variable in length (a characteristic also derived from the seed numbers of the random number generator and the specific application). For example, I²C protocol uses seven-bit addressing for devices on the communication bus. So the hash function may ensure that the master device address or authentication signature is hashed into random bit positions possibly over seven octets (bytes), such that one address bit or authentication bit occupies each octet. Although this example is minimally secure, it helps describe the use of the hashing function. This means that the data payload will be extended from n-bits to (n+ number of authentication bits) bits. The hash function will work for several communication protocols and requires the data payload to be further extended if n-bytes of data are less than the number of bits of the authentication signature used by the hash function. This ensures that there is a minimal number of authentication bits per octet transmitted.

Some integrated circuit manufacturers permit only a limited number of bits to be changed for communication bus addressing. For example some I²C devices might only have the ability to change the 3 lower bits of its bus address. If this is the case, an authentication signature as described above should be used by the hash function since it is easy to reverse engineer and determine the authorized bus addresses.

The results of the hash function in block 428 are updated on the same interval as the RNG 420 generates fresh random numbers, such that a new one exists with each communication frame, at a minimum. In one embodiment, only the current hash result (used for current data communication frame) is stored in volatile memory. All other previous values of the hash may never be stored and careful microprocessor memory practices, such as zeroizing previous memory locations before updating pointers, should be followed. The hash function may be stored in read-only memory (ROM) or FLASH memory of the chip 410.

Figure 5:
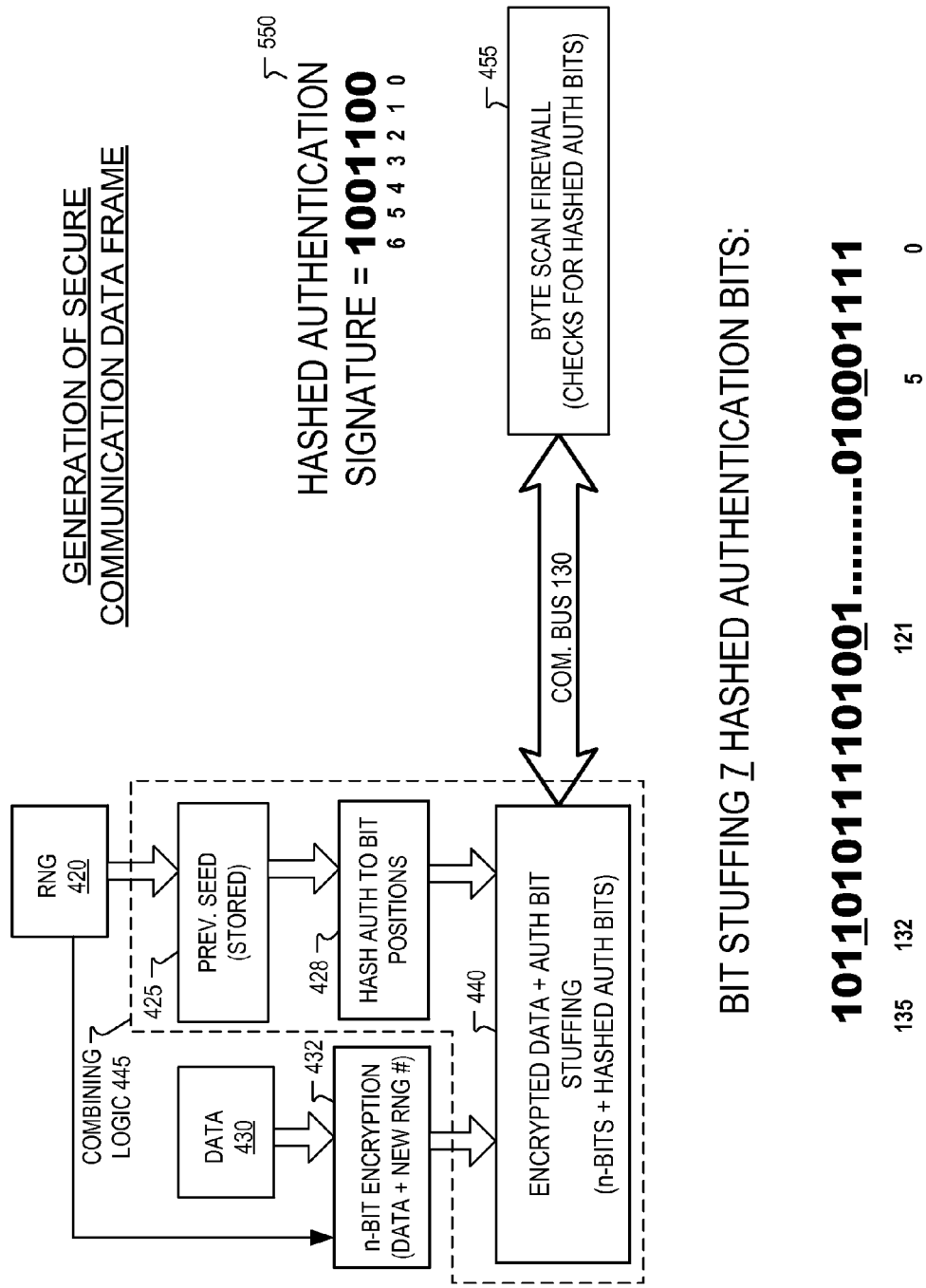
FIG. 5 illustrates generating a communication data frame with the sending chip illustrated in FIG. 4, in accordance with an embodiment of the disclosure.

As mentioned above, when the combining logic 445 is generating a communication frame by combining the hashed authentication signature and the encrypted data, combining logic 445 may insert, in random order, bits of the hashed authentication signature between bits of the encrypted data. FIG. 5 illustrates generating a communication frame with chip 410 that includes the hashed authentication signature 550 being inserted in random order between the encrypted data. It is appreciated that the $6^{th}$ bit of the hashed authentication signature 550 is stuffed into the $132^{nd}$ bit of the data, the $5^{th}$ bit of hashed authentication signature 550 is stuffed into the 121st bit of the data, and the $0^{th}$ bit of hashed authentication signature 550 is stuffed into the 5th bit of the data. The bits of hashed authentication signature 550 are notated by underlining, in FIG. 5.

In one embodiment, the communication frame is defined as the bytes of encrypted data block plus any protocol header or overhead (initialization bits, address bits, stop bits, etc.). For example, if 128-bit encrypted data is transmitted with the I²C protocol then a data frame is 1 start bit, 1 stop bit, 7 address bits, 1 R/W bit, 128 data bits and 17 ACK bits. Therefore this data frame totals 155 bits or 17 bytes of data and the start/stop bits.

The communication protocol and physical transport layer hardware used within chip 410 and chip 450 to operate communication bus 130 may be from existing commercially available technology following the protocol specifications. As mentioned previously, this secure communication system can be implemented with many existing inter-chip communication protocols such as I²C, SPI, SMBus, and others.

Referring back to FIG. 4, firewall logic 455 in chip 450 is coupled to communication bus 130 to determine whether the hashed authentication signature in the communication frame is valid. If valid, the communication frame should include the hashed authentication signature and the encrypted data from chip 410. The low-level firewall logic 455 on Slave devices (e.g. chip 450) may contain a table of authorized device addresses or signatures and tolerances which are stored in read-only memory ("ROM") or FLASH memory of the Slave device. This table may be programmed only during a secure process in manufacturing. The table is then used to permit or deny communications with the device, based on the hashed authentication signature.

If the hashed authentication signature or authentication bit within a received octet are valid, firewall logic 455 sends the communication frame to decryption logic 490. Firewall logic 455 may also cause chip 450 to send an Acknowledge ("ACK") signal 493 to chip 410 (sending control module) when the hashed authentication signature is valid.

If the hashed authentication signature or authentication bit within a received octet are not valid, firewall logic 455 sends an abort signal to decryption logic 490. Firewall logic 455 may also cause chip 450 to send a Not-Acknowledge ("NACK") signal 497 to chip 410 (sending control module) when the hashed authentication signature is not valid. The NACK signal may be a NACK-hold signal. NACK-hold is defined as a Slave (e.g. chip 450) device signaling a NACK using the communication protocol specification, but holds that bus state for a longer period of time and or holds the communication clock line such that the Master (e.g. chip 410) interprets a Stop communication, timeout or error but ultimately ceases communication with the Slave for a predefined period of time. For example, in the I²C protocol a NACK and STOP are both logic-High volts and holding the bus High will signal a stop condition or lost arbitration. In this case the Master 410 turns on the intrusion prevention circuit 140 to prevent further unauthorized use of the communication bus. No modification is necessarily required to the physical layer hardware to accomplish the NACK-hold, as it can be realized in firmware on each device so that the communication protocol specific conditions to stop communication are implemented.

In the illustrated embodiment, decryption logic 490 includes a decryption accumulator 460 that stores communication frames that will be decrypted by decryption block 465. Decryption accumulator 460 may be a buffer large enough to accommodate the n-bits of the communication frame. In one embodiment, decryption accumulator 460 is coupled to flush the decryption accumulator of the stored communication frames in response to the abort signal sent by firewall logic 455 in response to an invalid hashed authentication signature.

The encrypted data may include a freshly generated random number from RNG 420. In this case, the decryption logic is coupled to decrypt the encrypted data and then combine the freshly generated random number with a previous hash seed to generate a next hash seed. The next hash seed can then be sent to firewall logic 455 so that firewall logic 455 can determine whether a next hashed authentication signature in a next communication frame is valid.

Figure 6:
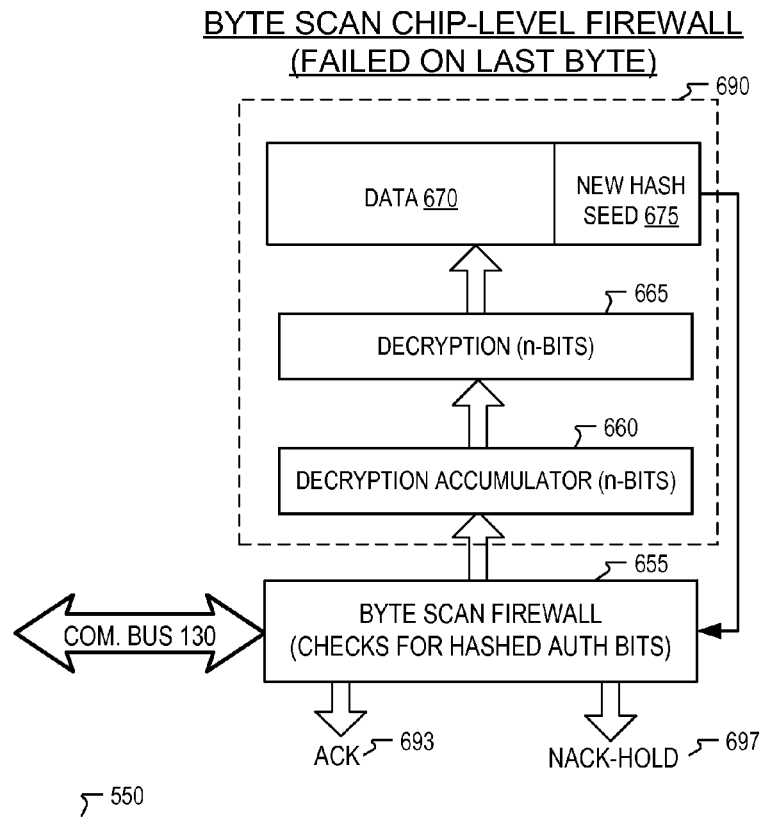
FIG. 6 illustrates an example low-level firewall scan using the receiving chip illustrated in FIG. 4, in accordance with an embodiment of the disclosure.

FIG. 6 illustrates an example low-level firewall scan using the receiving chip (chip 450) illustrated in FIG. 4, in accordance with an embodiment of the disclosure. More specifically, FIG. 6 illustrates a specific embodiment of firewall logic 655 performing an example byte scan on a communication frame sent over communication bus 130. The low-level firewall logic 655 on chip 450 scans each byte as it arrives from the communication bus for the appropriate binary value of the hashed authentication signature bit location that is determined by the hash function that is stored in a memory of chip 450. The hash algorithm is the same as is stored on chip 410. A random number (generated by RNG 420) decrypted from a previous communication frame is combined with a previous hash seed to generate a hash seed for the hash function. If the scanned byte has the correct hashed authentication signature bit value, then the byte is passed to the decryption accumulator to be temporarily stored. If the byte has an incorrect hashed authentication signature bit value, then the Slave device (e.g. chip 450) performs a NACK-hold, which temporarily ceases communication, and then flushes or zeroizes the decryption accumulator.

Still referring to FIG. 6, decryption accumulator 660 may accumulate all the bytes of encrypted data after they individually pass through firewall logic 655. The accumulator is sized to match the specified encryption algorithm or desired packet length. AES128 for example will have an accumulator of 128 bits. The decryption accumulator is flushed or zeroized if one of the incoming bytes from the current data communication frame does not pass the low-level firewall. In addition, the accumulator may be flushed or zeroized after successful decryption of the data or on power-down of the device (volatile memory).

FIG. 6 shows that firewall logic 655 scans the first byte of the communication frame and that the first byte is determined to be valid because, according to the hash function, the $132^{nd}$ bit of the communication frame (underlined in FIG. 6) matches the $6^{th}$ bit of the hashed authentication signature 550. Because the first byte is valid, chip 450 initiates an ACK signal. In the second byte, the $121^{st}$ bit of the communication frame (underlined in FIG. 6) matches the $5^{th}$ bit of the hashed authentication signature 550. Because the second byte is valid, chip 450 initiates an ACK signal. However, the $5^{th}$ bit of the last communication frame (underlined in FIG. 6) does not match the zero bit of hashed authentication signature 550. Because the last byte is invalid, chip 450 initiates a NACK-hold signal and flushes decryption accumulator 660. Chip 410 receives the NACK-hold signal and enables an intrusion prevention circuit, such as intrusion prevention circuit 140, in order to disable communication across communication bus 130. Depending on the secure implementation, chip 450 may also enable a similar intrusion prevention circuit.

The decryption block 665 may use existing technology for handling AES (and variants) or other proven encryption algorithms. Specific SoC decryption hardware accelerators may be beneficial to include in decryption block 665.

After the data is decrypted, the new randomly generated number (generated by RNG 420) sent in the communication frame is combined with the previous hash seed, as described herein, and then stored to be used with the next data communication frame firewall comparison. In addition, the complete authentication signature is also checked if the data communication frame is identified as containing this information.

The initial condition of the hashed authentication signature is predefined (or zeroized) so that only one data communication frame can occur with the first power-on event of the embedded device in a secure manufacturing process. All subsequent communication will use new system generated random authentication bits and seed numbers regardless of cycling the Master or Slave power.

It is noted that the embodiments described in FIGS. 1-3 may be used in conjunction with the illustrated embodiments of FIGS. 4-6. Those skilled in the art appreciate the embodiments disclosed may be used in conjunction with other cyber security practices, such as setting microprocessor fuse bits, standard encryption, and application layer protection like ANSI C12.22, etc.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An embedded system comprising:
a random number generator ("RNG"); and
a sending controller coupled to send communication data securely over a communication bus, wherein the sending controller is coupled to receive random numbers from the RNG, the sending controller including one or more integrated circuits with associated logic that when executed by the sending controller causes the sending controller to perform operations including:
generating an authentication signature of the sending controller by performing a system integrity check of the embedded system, the system integrity check including sending challenge signals to measure analog characteristics of the embedded system that includes the sending controller;
generating a fresh hash seed by combining a fresh random number from the RNG with an immediately prior hash seed, wherein the immediately prior hash seed is based on a history of previous hash seeds;
generating a hashed authentication signature based on the fresh hash seed and the authentication signature of the sending controller;
generating encrypted data by encrypting the communication data; and
generating a communication frame, the communication frame including combining the hashed authentication signature with the encrypted data by inserting bits of the hashed authentication signature between bits of the encrypted data.

2. The embedded system of claim 1,
wherein generating the encrypted data further includes encrypting a combination of the communication data with the fresh random number.

3. The embedded system of claim 1, wherein the combination of the communication data with the fresh random number further includes inserting the bits of the hashed authentication signature in random order between the bits of the encrypted data.

4. The embedded system of claim 1, further comprising a receiving controller coupled to the communication bus to receive the communication frame from the sending controller, and wherein the receiving controller includes firewall logic coupled to reject the communication frame when the hashed authentication signature is not correct.

5. The embedded system of claim 1, wherein the RNG is external to the sending controller.

6. The embedded system of claim 1, further comprising:
circuitry having an electrically oscillating characteristic; and
an analog-to-digital converter coupled to the circuitry to measure the electrically oscillating characteristic, the analog-to-digital converter further coupled to output a digitized value indicative of the electrically oscillating characteristic to the RNG for generating the fresh random number.

7. The embedded system of claim 1, further comprising:
memory coupled to the sending controller, the memory storing read-only data containing predetermined tolerances for the system integrity check of the embedded system including the sending controller, and wherein the one or more integrated circuits of the sending controller include further logic that when executed by the sending controller causes the sending controller to perform additional operations including:
comparing the measured analog characteristics of the embedded system including the sending controller with the predetermined tolerances to identify unauthorized access to the embedded system.

8. The embedded system of claim 1, wherein the analog characteristics of the embedded system measured when performing the system integrity check includes the communication bus.

9. The embedded system of claim 8, further comprising:
a receiving controller coupled to the communication bus to receive the communication frame over the communication bus from the sending controller, and wherein when performing the system integrity check the analog characteristics of the embedded system measured include all communication pathways between the sending controller and the receiving controller, including the communication bus.

10. An embedded system comprising:
a receiving controller coupled to receive a communication frame securely over a communication bus from a sending controller, the communication frame including bits of a hashed authentication signature identifying the sending controller between bits of encrypted data, wherein the encrypted data includes a fresh randomly generated number, and wherein the receiving controller includes one or more integrated circuits with associated logic including:
firewall logic coupled to the communication bus to determine whether the hashed authentication signature in the communication frame is valid;
decryption logic coupled to the firewall logic, wherein the firewall logic sends the communication frame to the decryption logic when the hashed authentication signature is valid, and wherein the firewall logic is coupled to send an abort signal to the decryption logic when the hashed authentication signature is not valid, wherein the decryption logic is coupled to decrypt the encrypted data to obtain the fresh randomly generated number to generate a fresh hash seed by combining the fresh randomly generated number with an immediately prior hash seed, wherein the immediately prior hash seed is based on a history of previous hash seeds, and wherein the decryption logic is coupled to send the fresh hash seed to the firewall logic for determining whether a next hashed authentication signature in a next communication frame is valid.

11. The embedded system of claim 10, wherein the sending controller includes hash logic coupled to generate the hashed authentication signature from a hash seed and an authentication signature of the sending controller.

12. The embedded system of claim 10, wherein the decryption logic includes a decryption accumulator, and wherein the decryption logic is coupled to flush the decryption accumulator in response to receiving the abort signal from the firewall logic.

13. The embedded system of claim 12, wherein the receiving controller is coupled to send a Not-Acknowledge ("NACK") to the sending controller when the hashed authentication signature is not valid.

14. The embedded system of claim 10, wherein the receiving controller is coupled to send an Acknowledge ("ACK") to the sending controller when the hashed authentication signature is valid.

* * * * *